United States Patent [19]

Krzciok

[11] Patent Number: 4,777,692

[45] Date of Patent: Oct. 18, 1988

[54] SCRAPER FOR LAWN MOWER HOUSING

[76] Inventor: Richard Krzciok, 2059 Galahad NE., Grand Rapids, Mich. 49505

[21] Appl. No.: 34,674

[22] Filed: Apr. 6, 1987

[51] Int. Cl.$^4$ ............................................. A47L 25/00
[52] U.S. Cl. ................... 15/236.07; 15/104 S
[58] Field of Search ................. 15/236 R, 245, 104 S, 15/105.5, 235.3

[56] References Cited

U.S. PATENT DOCUMENTS

| | | | |
|---|---|---|---|
| 2,634,497 | 4/1953 | Waldesbuehl | 15/236 R |
| 2,964,773 | 12/1960 | Pence | 15/245 |
| 3,485,236 | 12/1969 | Frost | 15/104 S |
| 4,064,588 | 12/1977 | Cooper | 15/235.3 |
| 4,297,761 | 11/1981 | Loos | 15/104 S |

Primary Examiner—Philip R. Coe
Assistant Examiner—Corinne M. Reinckens
Attorney, Agent, or Firm—Price, Heneveld, Cooper, DeWitt & Litton

[57] ABSTRACT

A scraper for the inner surfaces of the housing or undercarriage of a lawn mower. The scraper is constructed of a metal sheet of elongated shape having a straight scraper edge along one side, an elongated handle extending along the other side and different configurated ends for accommodating differently shaped surfaces of different lawn mowers. In a preferred form, one of the ends is arcuate in shape and also arcuately bent in a third dimension for providing a saddle in which the user can place his or her thumb for ease in handling the scraper.

4 Claims, 2 Drawing Sheets

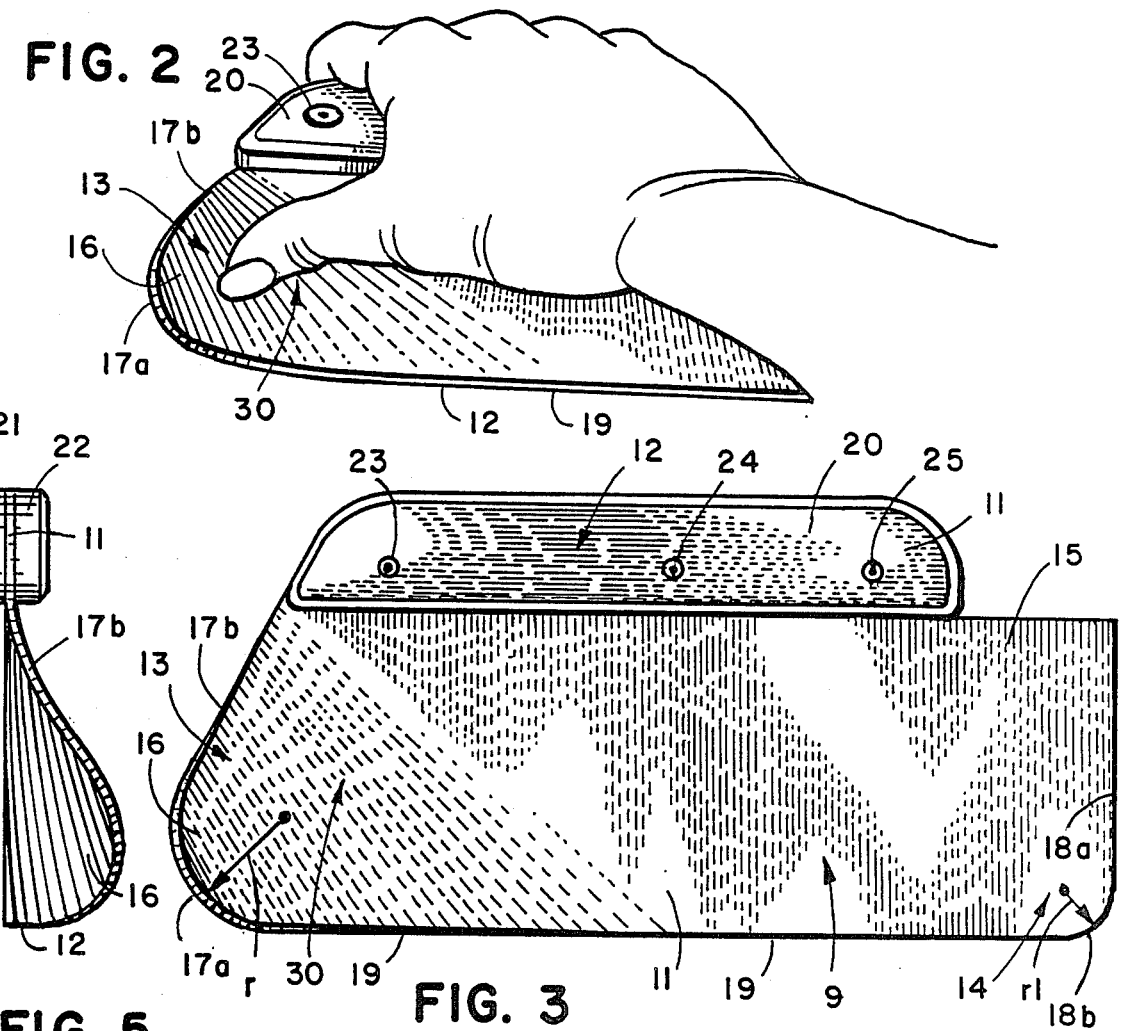

SCRAPER FOR LAWN MOWER HOUSING

This invention relates to a scraper for a lawn mower housing especially for the purpose of cleaning grass and other debris that is collected and is impacted along the inside of the housing.

BACKGROUND OF THE INVENTION

Rotary mowers of the type that include a blade rotatably mounted within a housing are well known and used extensively. One problem with such mowers is that the grass cut by the blades is forced against the sides and particularly the corners of the housing in which the blade is located and, as a result, the grass accumulates and is impacted inside the housing greatly reducing the efficiency of the mower and sometimes effecting the operation thereof. As a result, it is desirable to clean the inside surfaces of the housing or so-called undercarriage each time that the mower is used in order to eliminate any interference by the collection of the cut grass and other debris. The problem that has existed is that it is very difficult to scrape the collected grass from the inside walls of the housing or undercarriage with implements that are presently in existence. Frequently, a screwdriver or other sharp instrument is used for that purpose but they are very inefficient and are difficult to use. Further, such instruments do not do a good job of cleaning and, as a result, the operation of the mower is not completely satisfactory.

The problem is accentuated when the grass is very wet and accumulates on the inside surface of the housing or undercarriage and eventually dries forming a matted material that is especially difficult to remove.

Attempts have been made to devise a tool or scraper for scraping the inside surface of such housings or undercarriages such as that disclosed in U.S. Pat. No. 4,485,516. In my opinion, based on experience in scraping the inside surfaces of lawn mower housings the scraper of U.S. Pat. No. 4,485,516 will be difficult to use because of the long handle. Also it does not have the necessary scraping abilities to scrape all of the differently shaped surfaces of the inside of the housing, which surfaces are arcuate, flat and arranged at various angles with respect to each other.

SUMMARY OF THE INVENTION

In accordance with the present invention, I provide a tool that is designed to scrape all of the various surfaces of the mower undercarriage. Further, it is very easy to use and inexpensive to manufacture.

In accordance with the invention, I provide an elongated shaped sheet of metallic material having along one side thereof an edge designed to scrape the inner, flat side flanges of the lawn mower undercarriage or housing. This side edge merges with an arcuate end edge designed to scrape the curved corner of the lawn mower housing. At the other end of the sheet is another flat edge designed to scrape the flat bottom of the lawn mower. Opposite the side edge is a means for mounting an elongated handle extending a substantial distance alongside of the sheet material and secured thereto.

In accordance with a preferred embodiment of this invention, the arcuate edge, which is designed to scrape the curved corner of the lawn mower housing, is bent at an arcuate angle so as to give it a third dimension and provide a cradle in which the thumb of the user can be placed for ease in handling and scraping. Thus, the user can grasp the elongated handle with his or her fingers, placing his or her thumb on the cradle formed by the bent arcuate edge and manipulate the scraper at the proper angle with respect to the surfaces of the inside of the undercarriage or housing so as to easily and efficiently scrape the debris from such surfaces.

BRIEF DESCRIPTION OF THE DRAWINGS

For a more detailed explanation of this invention, reference is made to the accompanying drawings in which:

FIG. 2 is a partial perspective view of the scraper illustrating how the scraper is gripped by the hand of a user;

FIG. 3 is a side elevational view of the scraper shown in FIG. 1;

FIG. 4, is a top plan view of the scraper as shown in FIG. 1;

FIG. 5 is a side view of the scraper; and

FIG. 6 is a bottom view of the scraper.

DESCRIPTION OF THE PREFERRED EMBODIMENT

Figure 1:
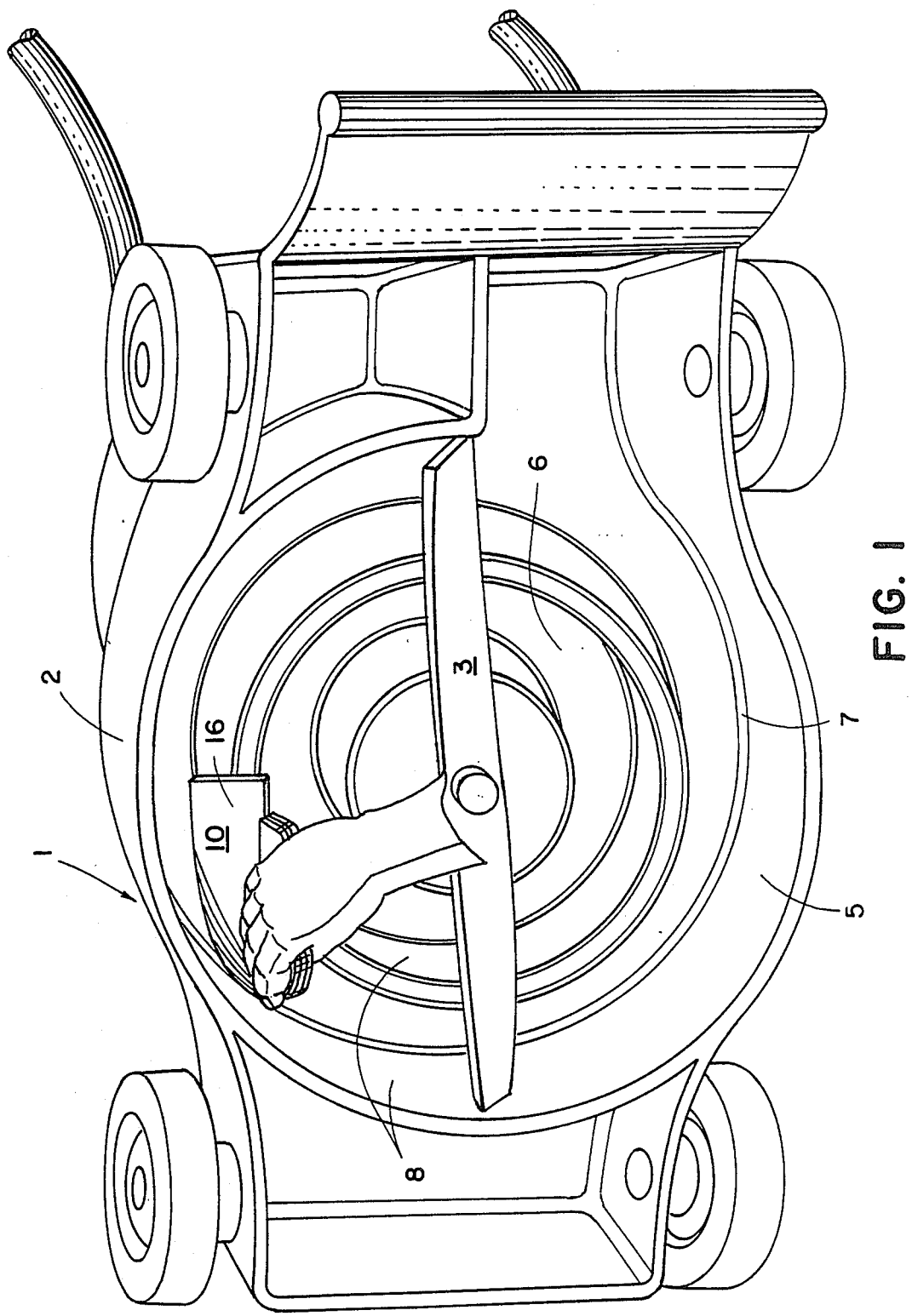
FIG. 1 is a perspective view of a lawn mower housing and the scraper of this invention illustrating how the scraper is grasped and manipulated during the scraping operation.

Referring now to the drawings and in particular to FIG. 1, reference numeral 1 is a lawn mower tipped up exposing the inside surface of its housing or undercarriage 2 in which is rotatably mounted the blade 3 which is driven by a motor (not shown). The housing or undercarriage 2 has the inside side flange surfaces 5, the top flat surfaces 6 and the arcuate corner surfaces 7 between surfaces 5 and 6. Also shown in FIG. 1 is the matted debris 8 such as grass and the like which is stuck to the inside surfaces 5, 6 and 7.

Reference numeral 10 designates the scraper of this invention which includes a sheet 9 of steel cut to the configuration as disclosed in FIG. 3. This configuration of the elongated sheet includes the two sides 11 and 12 and the ends 13 and 14. Side 11 has a straight edge 19 designed to scrape the inner flat surfaces of side flanges of the lawn mower housing or undercarriage. The side 12 is designed for mounting the handle 20 as will be described hereinafter. It will be noted that the side 12 terminates short of the end 14, providing the extension 15 for a scraping purpose as will be described hereinafter.

The end 13 is an arcuately shaped end nose 16 formed by an arc 17a having the radius "r". The arc 17a extends tangentially from the scraping edge 19 away from the central portion of the sheet. It terminates at and is tangent to edge 17b which extends at an angle inwardly toward the central portion of the sheet and merges with the side 11 to which the handle 20 is attached.

The other end 14 includes a straight edge 18a which merges with the arc 18b having the radius "r1" which connects straight edge 19 of the side 11 with the straight egge 18a of the end 14. It will be observed that radius "r1" is substantially less than the radius "r" at the end 13. This is specifically provided for the purpose of providing an arcuate scraping edge for scraping smaller curved areas of the lawn mower undercarriage or housing.

The handle 20 extending along the side 12 can take many different forms but I prefer that it include two pieces 21 and 22, one located on one side and the other on the other side of the end 12 of the sheet material. The handle is secured to the sheet by three fasteners 23, 24 and 25 extending through the openings in the sheet and the handle pieces.

OPERATION

Having described my invention, the scraper is used only when the motor is stopped. Preferably the housing or undercarriage is tipped on its side to give greater access to the inner surfaces 5, 6 and 7 under the housing or undercarriage. In using the scraper, the user grasps the handle 20 with his or her fingers and cradles his or her thumb on the arcuate portion 30 between the curved portion of the end 13 and the flat section of the sheet (FIG. 2). In so doing he or she has maximum control of the entire tool and can position the scraper at the various angles as required to scrape all of the various shaped surfaces along the undercarriage or housing. The scraper is arranged so that the edge 17a which is designed to scrape the curved corner surfaces 7 of the lawn mower undercarriage, fits into the corner for scraping the debris. If the curvature of the corner surfaces 7 are too small and the edge 17a does not reach entirely into the corner surface, the operator uses the edge 18a defined by the radius "r1" to scrape such smaller radius corners 7.

The edge 19 of the side 11 is designed to scrape the inner flat side flange surfaces 5 of the lawn mower undercarriage, whereas the edge 18a of the end 14 is designed to scrape the flat top surface 6 of the lawn mower undercarriage or housing. In all cases, the matted material is dislodged by such scraping. As disclosed in FIGS. 3 and 5, the side 12 on which the handle 20 is mounted, is terminated short of the end 14. The specific purpose of this is to provide an extended portion so as to locate the edge 18 a distance from the handle 20 permitting the end 14 to be inserted into the housing to scrape the flat top surfaces 6 of the lawn mower undercarriage or housing.

It should be evident that the present scraper is useful on many different mowers since scraping surfaces are provided for different shaped surfaces of the mower housing. Therefore, this scraper can be used on many different sizes and shapes of mowers.

It should be understood that although I have disclosed a preferred embodiment of the present invention, other embodiments can be utilized without departing from the spirit of the invention.

The embodiments of the invention in which an exclusive property or privilege is claimed are defined as follows:

1. A scraper for cleaning a law mower housing comprising an elongated sheet of metal having edges adapted to scrape accumulated grass from the inside surfaces of a lawn mower's housing; said sheet including two opposite sides and two opposite ends, one of said sides being a substantially straight scraping edge extending lengthwise of said sheet and merging with one of said ends having an arcuate scraping edge;

a straight scraping edge at the other end of said sheet;
an elongated handle extending along and secured to the other side of said sheet; and
said one of said sheet at the arcuate scraping edge being bent at an angle to the plane of said sheet forming a cradle in which the thumb of a user gripping said elongated handle can be placed for ease in manipulating said scraper.

2. A scraper for cleaning a lawn mower housing comprising an elongated sheet of metal having edges adapted to scrape accumulated grass from the inside surfaces of a lawn mower's housing; said sheet including two opposite sides and two opposite ends, one of said sides being a substantially straight scraping edge extending lengthwise of said sheet and merging with one of said ends having an arcuate scraping edge;

a straight scraping edge at the other end of said sheet;
an elongated handle extending along and secured to the other side of said sheet; and
said arcuate scraping edge at said one end extending from said side scraping edge away from the central portion of said sheet and then curving inwardly toward said central portion and terminating at said one side of said sheet; said one edge being bent at an angle to the plane of said sheet forming a cradle on which the thumb of a user gripping said elongated handle can be placed for ease in manipulating said scraper.

3. The scraper of claim 2 in which the said handle extends from the termination of said arcuate scraping edge to a point spaced from said straight scraping edge at the other end of said sheet.

4. The scraper of claim 3 in which a second arcuate edge of substantially less radius than said arcuate edge at said one end is located between and connects said side scraping edge and said straight scraping edge at said other end.

* * * * *